G. R. BARKER.
CUSHIONED WHEEL.
APPLICATION FILED JUNE 8, 1917.

1,328,779.

Patented Jan. 20, 1920.
2 SHEETS—SHEET 1.

Witness:
R. F. Farrington

Inventor:
George R. Barker
by Albert Scheible,
Attorney

G. R. BARKER.
CUSHIONED WHEEL.
APPLICATION FILED JUNE 8, 1917.

1,328,779.

Patented Jan. 20, 1920.
2 SHEETS—SHEET 2.

Inventor:
George R. Barker
by Albert Scheible,
Attorney

Witness:
R. L. Farrington.

UNITED STATES PATENT OFFICE.

GEORGE R. BARKER, OF CHICAGO, ILLINOIS.

CUSHIONED WHEEL.

1,328,779.               Specification of Letters Patent.      Patented Jan. 20, 1920.

Application filed June 8, 1917. Serial No. 173,656.

*To all whom it may concern:*

Be it known that I, GEORGE R. BARKER, a citizen of the United States, residing at Chicago, Illinois, have invented certain new and useful Improvements in Cushioned Wheels; and I do hereby declare the following to be a full, clear, and exact description of the invention, such as will enable others skilled in the art to which it appertains to make and use the same.

My invention relates to the general class of resilient wheel in which at least part of the resiliency is furnished by cushioning means disposed between inner and outer rim members, and more particularly to wheels of this kind in which the cushioning means comprise elements disposed substantially in annular formation between the inner and outer rim members. In wheels of this general class, it has been found necessary in practice to provide one or more webs upon the periphery of the inner rim so as to coöperate with the cushioning means in resisting side thrusts upon the wheel; also, to provide other formations upon the periphery of the wheel, such as the socalled "driving dogs" 11 of U. S. Patent No. 1195379 to Francis Mead, to prevent a slipping of the cushioning means upon the periphery of the inner rim. The necessity of providing these formations has made it difficult to equip old types of wheels with inner-cushioned rims of the general order of those shown in the said Mead patent, as the inner rim had to be fitted with a special steel banding which required machinery for properly attaching them to the inner felly of the wheel.

Likewise, special outer tread rims have been required, so as to provide a construction in which the side flanges would not slip upon the rim, thereby making it impossible to utilize the standard types of demountable tread rims. Consequently, both the inner and outer rim portions have required a large number of special parts necessitating expensive manufacturing equipment and making it impossible to utilize standard wheel parts for repairs or in emergencies.

My invention aims to overcome these and other objections by providing an inner rim banding and a side flange construction both adapted to be secured to standard types of wheel parts, thereby enabling me to utilize both the standard non-resilient wheel bodies and standard types of demountable tread-carrying rims. In one of its aspects, my invention aims to provide a cheaply manufactured banding which can easily be attached to standard wheel bodies to afford the above described cushion-abutting formations, and which will automatically compensate for any petting variations in the size and shape of the wheel. In another aspect, my invention aims to provide side flanges so constructed that they can be fitted to standard types of demountable rims with comparatively simple machining, which can then be quickly attached to such rims, and which will not slip peripherally of the rims when thus attached.

More particularly, my invention aims to provide a sectional cushion-engaging banding for the inner wheel rim, and to provide simple means for securing each section to the felly of the wheel; to provide simple means for operatively interlocking the side flanges with the demountable tread-rim, for preventing a relative spreading of these flanges when the wheel is subjected to side strains, and to provide common means for maintaining these flanges in position and for limiting the circumferential movement of the tread-rim with respect to the inner wheel portion. Further objects will appear from the following specification, which more particularly describes the embodiment of my invention illustrated in the accompanying drawings. In these drawings, Figure 1 is a fragmentary side elevation of a resilient wheel.

Figure 1:
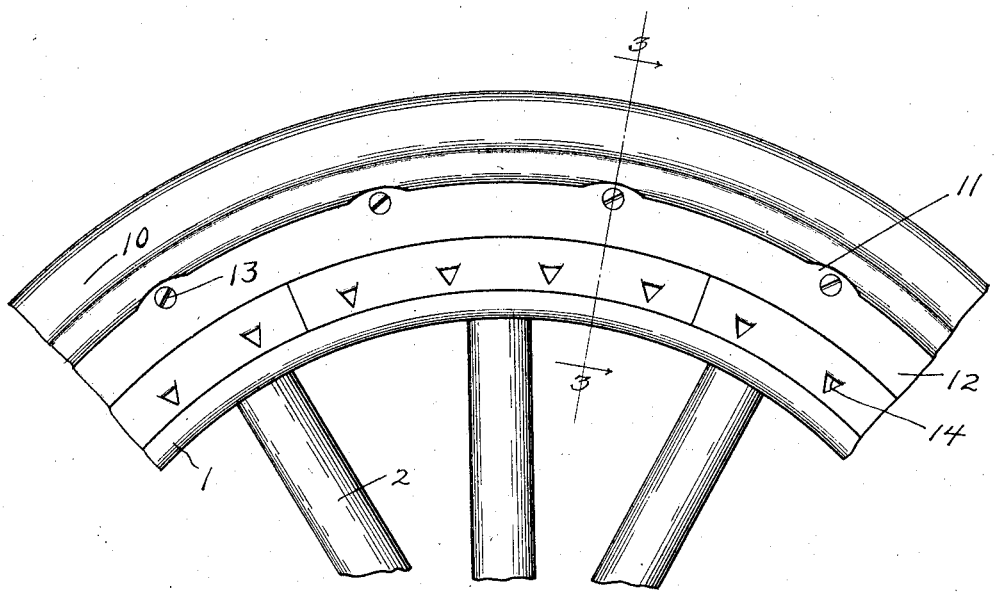
Figure 2:
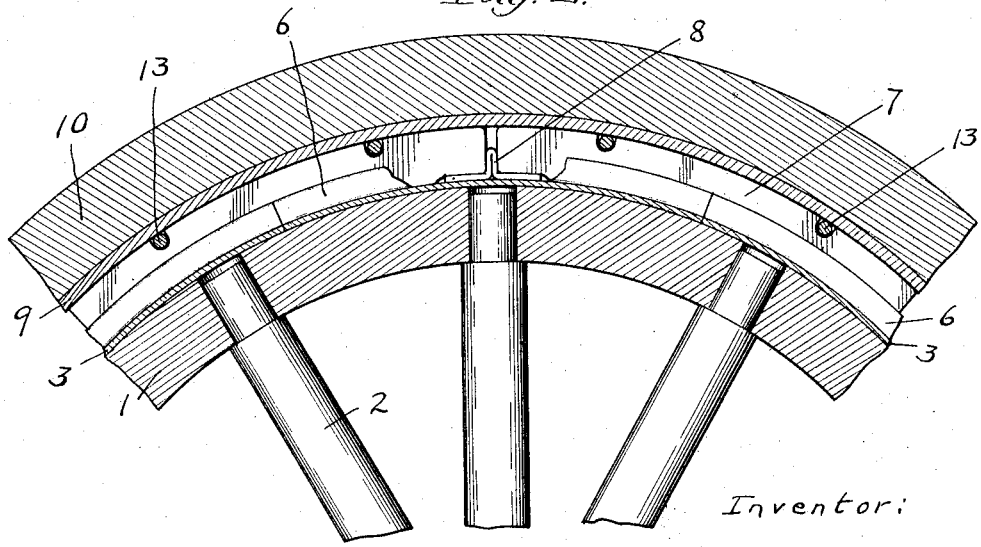
Fig. 2 is a medial section through the same on a plane at right angles to the axis of the wheel.
Figure 3:
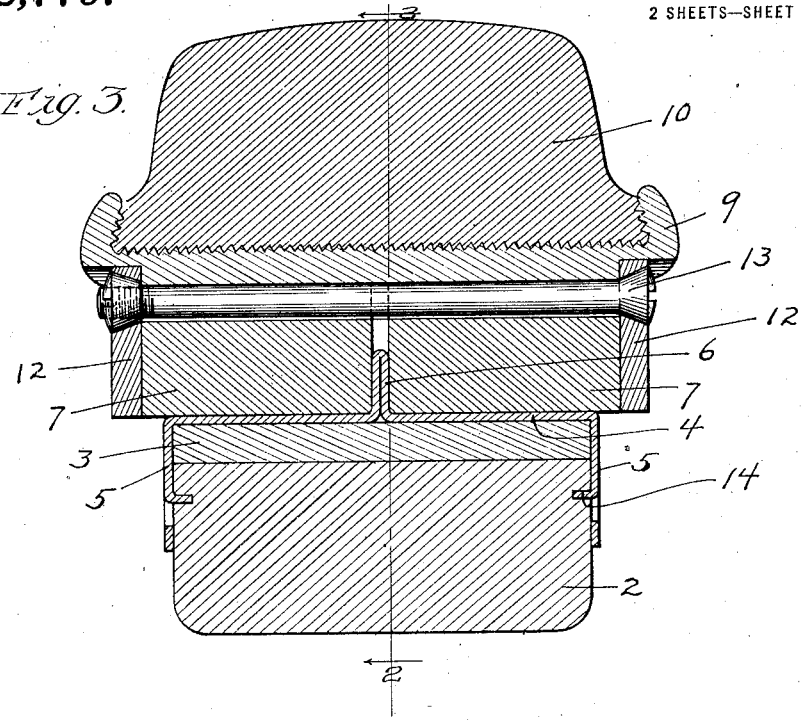
Fig. 3 is an enlarged transverse section along the line 3—3 of Fig. 1.
Figure 4:
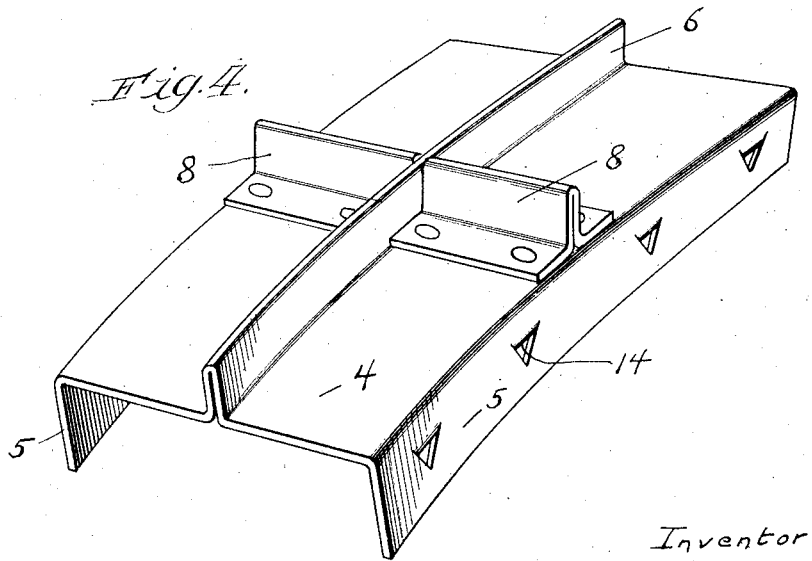
Fig. 4 is a perspective view of one of the sectional members used in the wheel construction as here illustrated.

In applying my invention to an ordinary wheel having a wood felly 1 supported by spokes 2 and encircled by a steel tire or socalled " S A E band " 3, I construct a sectional jacket for the peripheral portion of this wheel body. In the illustrations, each section of this jacket comprises a sheet metal member having a back 4 curved to encircle the band 3 for (say) one-eighth of the periphery of the latter, and equipped with side webs 5 spaced by the width of the wood felly 1. Each of these sections is also equipped with cushion-engaging formations suited to the particular wheel construction for which the wheel is to be used. Thus, for wheels of the said Mead type, the back 4 on certain sections has a central web 6 formed upon its outer surface to constitute a spacer for the rubber cushions 7, and also has transverse webs 8 mounted at opposite sides of the web 6, the transverse webs on certain sections of the jacket being so spaced as to abut against the respective ends of a single cushion 7.

For the outer rim of the proposed resilient wheel, I likewise utilize a standard type of wheel parts, in the form of a demountable rim 9 of larger diameter than the outside diameter of the said S A E band 3 and fitted with the usual tread rim 10. Each side of the rim 9 is machined by cutting out arcuate recesses adapted to receive projecting lugs 11 on side flanges 12, so that these lugs may enter the recesses and thus interlock with the rim 9 as shown in Fig. 1. To hold the side flanges 12 against sliding laterally out of these recesses, I provide suitable fastening members, such as the bolts 13 of the drawings, which bolts extend through transverse grooves in the outer faces of the rubber cushions 7.

In assembling the wheel just described, the consecutive sections of the jacket are slipped over edge portions of the wheel body and each section is anchored to the wheel body by suitable means, as by interlocking the side webs 5 with the felly 1. For the latter purpose, I desirably punch prongs 14 from the webs 5, which prongs may be forced into the wood of the felly 1 by simple tools, thus avoiding the use of nails or screws or other fastening elements which might work loose when the wheel is in service. After the entire jacket has thus been applied, the cushions 7 can readily be positioned on the jacket, and the outer wheel member with its side flanges can be secured in position. With the parts thus assembled, it will be obvious from the drawings that the webs 8 afford abutments for the ends of the cushions 7 to prevent the latter from sliding peripherally on the inner wheel member, and that the engagement of the bolts 13 with the walls of the transverse grooves in the cushions 7 will likewise prevent any considerable movement of the outer wheel member circumferentially of the wheel, with respect to the cushions. Consequently, the webs 8 and the bolts 13 will act as " driving dogs " to insure a positive rotational connection between the inner and outer wheel members, while permitting the longitudinal compression of the cushions to afford the desired elasticity and resiliency in this connection. Likewise, the medial webs 6 will coöperate with the side flanges 12 to resist side strains upon the wheel, so that my construction enables me to duplicate the action of the wheel of the said Mead patent without requiring expensive and difficultly manufactured parts. However, while I have pictured the webs 6 and the prongs 14 as formed integral with the jacket sections, I do not wish to be limited to these or other details of the construction and arrangement here described, it being obvious that the same might be modified in many ways without departing from the spirit of my invention.

I claim as my invention:

1. In a wheel having a plurality of cushioning elements consecutively disposed in annular formation between inner and outer members, an inner felly, and segmental rim elements secured independently of each other to the felly in substantially continuous annular formation; each rim element comprising a single-piece sheet metal plate formed to a U-shaped cross-section and straddling a portion of the felly and having its central portion folded upon itself to form a web extending radially outward of the felly, and a driving dog secured to the said plate and extending transversely of the web.

2. A combined felly protector and driving member for a wheel having cushioning elements consecutively disposed in two annular formations between inner and outer fellies, comprising a U-sectioned metal plate having its medial portion doubled upon itself to afford a web extending radially outward of the wheel and having the arms of the U laterally engaging the sides of the felly and a pair of driving dogs secured to the back of the U-shaped plate and extending transversely of the said web at opposite sides of the latter.

3. A wheel member as per claim 2, in which each of the driving dogs comprises a single piece of sheet metal folded centrally and flatwise upon itself and thereafter having its ends bent at right angles to the fold and in substantial alinement with each other.

4. In a wheel, an outer member comprising a tread rim, a pair of side flanges, the said rim and flanges having interengaging formations for preventing relative rotation thereof; and bolts connecting the flanges and normally holding the said formations on the rim interlocked with those on the flanges.

5. In a resilient wheel, relatively spaced inner and outer rim members, side flanges carried by one of said members and extending toward the other thereof, bolts connecting the side flanges, radial projections upon the last named members, and cushions disposed between said members and engaging both said projections and said bolts.

6. In a wheel, relatively spaced inner and outer rims, cushions disposed in substantially annular formation therebetween, side flanges associated with one of the rims and extending toward the other rim, driving dogs carried by the last named rim and engaging the cushions, and common means carried by the side flanges for holding the latter in their normal positions and for engaging the cushions.

7. A wheel as per claim 4, in which the interengaging formations comprise recesses in the tread rim and correspondingly shaped lugs on the side flanges.

Signed at Chicago, June 5th, 1917.

GEORGE R. BARKER.